United States Patent [19]

Colella

[11] Patent Number: 5,237,007
[45] Date of Patent: Aug. 17, 1993

[54] CLEAR TOUGH ALLOYS

[75] Inventor: Michael Colella, Plantsville, Conn.

[73] Assignee: Novacor Chemicals (International) S.A., Fribourg, Switzerland

[21] Appl. No.: 848,732

[22] Filed: Mar. 9, 1992

[51] Int. Cl.$^5$ .................. C08L 53/02; C08L 25/14; C08L 33/08; C08L 33/10
[52] U.S. Cl. .................................. 525/693; 525/89; 525/95; 525/98; 525/241; 525/224; 525/227
[58] Field of Search ................ 525/89, 93, 95, 98, 525/241, 224, 227

[56] References Cited

U.S. PATENT DOCUMENTS 3,906,057  9/1975  Durst ................................. 525/89

OTHER PUBLICATIONS

Chemical Abstract, 109:171278v.
Chemical Abstract, 106:85901z.
Chemical Abstract, 112:8285y.
Chemical Abstract, 99:196070j.
Chemical Abstract, 111:8522c.

Primary Examiner—James J. Seidleck
Assistant Examiner—W. R. H. Clark
Attorney, Agent, or Firm—Bruce E. Harang

[57] ABSTRACT

A tough transparent polymer alloy comprises from 98 to 85 weight % of a styrene acrylic polymer and from 2 to 15 weight % of a blend comprising from 70 to 90 weight % of a high styrene styrene-butadiene polymer and from 30 to 10 weight % of a high butadiene styrene-butadiene polymer. The resulting alloy has good clarity and impact properties.

6 Claims, No Drawings

CLEAR TOUGH ALLOYS

FIELD OF THE INVENTION

The present invention relates to polymer alloys comprising a copolymer of a vinyl aromatic monomer and an ester of an ethylenically unsaturated carboxylic acid blended with a mixture of polymers of vinyl aromatic monomers and conjugated diolefins one of which has a relatively higher vinyl aromatic content and one of which has a relatively higher conjugated diolefin content.

BACKGROUND OF THE INVENTION

Copolymers of vinyl aromatic monomers such as styrene and esters of ethylenically unsaturated carboxylic acids such as the acrylate and methacrylate esters have been know for some time. These polymers are useful in a number of applications in which clarity is required. These polymers are used in a number of applications such as housewares including glasses and food containers. It is always desirable to improve on the toughness of these types of polymers. However, it is also desirable to improve on their environmental stress crack resistance. Environmental stress cracking is the development of small cracks in the plastic on exposure to substances such as detergents and fats and oils. Over time with repeated exposure to such substances the number of these cracks increase leading to an increased haze in clear products and ultimately the failure of the plastic. It would be desirable to improve the environmental stress crack resistance of such copolymers and to also improve the impact toughness of the alloys while maintaining excellent clarity.

U.S. patent application Ser. No. 654,058 in the name of W. G. Blasius, assigned to Polysar Financial Services S.A. (now, Novacor Chemicals (International) S.A.) discloses and claims alloys comprising from 30 to 82 weight % of a clear brittle polymer, such as a styrene acrylate, from 3 to 50 weight % of a rubbery polymer and from 15 to 67 weight % of a ductile polymer. The Blasius patent application contemplates lower amounts of the styrene acrylate polymer than contemplated in the present case. Furthermore, the Blasius application does not disclose that the products have an improved environmental stress crack resistance.

U.S. patent application Ser. No. 758,802, filed Sep. 12, 1991 in the names of D. Hauser, M. Colella and W. G. Blasius discloses and claims the use of the alloys of the type disclosed in the Blasius application in house wares. The utility of the patent application is that the housewares have better environmental stress crack resistance. The present patent application is limited to the case where there is a lower content of styrene acrylate. There is nothing in the Hauser patent application which discloses that compositions having a higher content of styrene acrylate would also have improved environmental stress crack resistance. In fact, as the Hauser application teaches, the improvement to environmental stress crack resistance is due to the components other than the styrene acrylate polymer, increasing this component would be expected to reduce the environmental stress crack resistance.

Chemical Abstracts 109:171278v [Polym. Prepr. (Am. Chem. Soc., Div. Polym. Chem.) 1988, 29(2), 180-1] discloses that physical blends of block SBR (styrene content: 75.2 weight %) and a copolymer of methyl methacrylate and styrene are partially compatible. The morphological and mechanical properties of the blend are strongly dependent on the molding/mixing process used to produce the blend. The SBR could only be toughened when the ideal morphology of the blend was obtained.

Chemical Abstracts 106:85901z [JP 61/200,151] discloses thermoplastic compositions comprising from 5 to 95 weight % of a block copolymer and from 95 to 5 weight % of a thermoplastic polymer (e.g. ABS). The block copolymer is derived from coupling an aromatic vinyl polymer block with an aromatic vinyl monomer-conjugated diene copolymer block. The subject thermoplastic compositions apparently have improved impact strength.

Chemical Abstracts 112:8285y [JP 61/291,610] discloses the use of "impact modifiers" for thermoplastic polymers. The modifiers are basically similar to the block copolymer disclosed by Chemical Abstracts 106:85901z.

Chemical Abstracts 99:196070j [JP 58/122,954] discloses improvement of anisotropy of a styrene hydrocarbon-conjugated diene block copolymer by blending it with a styrene-methacrylic ester copolymer. Such a blend, when extruded to form a molded plate, apparently possesses superior physical properties.

Chemical Abstracts 111:8522c [JP 01/45614] discloses high-impact styrene polymer compositions comprising a major amount of a styrene (50 to 90 weight %)-conjugated diene (50 to 10 weight %) block copolymer and a minor amount of a styrene-based polymer (e.g. styrene-methyl methacrylate copolymer).

The present invention seeks to provide a clear polymer having good environmental stress crack resistance. Additionally the polymer should have improved toughness.

SUMMARY OF THE INVENTION

The present invention provides a polymer alloy comprising:
  (i) from 98 to 85, preferrably from 97.5 to 90 weight % of an essentially transparent copolymer comprising:
    (a) from 90 to 30 weight % of one or more $C_{8-12}$ vinyl aromatic monomers which are unsubstituted or substituted by a $C_{1-4}$ alkyl radical;
    (b) from 10 to 70 weight % of one or more $C_{1-6}$ alkyl esters of $C_{3-6}$ ethylenically unsaturated carboxylic acids; and
    (c) from 0 to 5 weight % of one or more $C_{3-6}$ ethylenically unsaturated carboxylic acids; and
  (ii) from 2 to 15, preferrably from 2.5 to 10 weight % of an blend of polymers of vinyl aromatic monomers and conjugated diolefin monomers comprising:
    (a) from 70 to 90 weight % of a relatively higher styrene containing linear or radial di- or tri-block polymer comprising: (A) from 60 to 90 weight % of one or more $C_{8-12}$ vinyl aromatic monomers which are unsubstituted or substituted by a $C_{1-4}$ alkyl radical; and (B) from 40 to 10 weight % of said $C_{4-6}$ conjugated diolefin; and
    (b) from 30 to 10 weight % of a relatively higher conjugated diolefin containing tapered- or linear- or radial-block copolymer comprising: (A) from 30 to 70 weight % of one or more $C_{8-12}$ vinyl aromatic monomers which are unsubstituted or substituted by a $C_{1-4}$ alkyl radical; and (B) from 70 to 30 weight % of one or more $C_{4-6}$ conjugated diolefins.

DESCRIPTION OF THE PREFERRED EMBODIMENTS

As used in this specification:

"essentially transparent" means a copolymer having a haze of less than 10%, preferably less than 5%, as measured by ASTM D-1003; and "blend" when used in conjunction with polymers of the relatively higher vinyl aromatic monomer and polymers of the relatively higher conjugated monomer means a mixture. The "blend" need not be precompounded nor is the term intended nor does it imply any order of mixing of the components of the present invention.

The essentially transparent copolymer used in accordance with the present invention comprises:

(a) from 90 to 30, preferably from 80 to 40, most preferably from 55 to 75, weight % of one or more $C_{8-12}$ vinyl aromatic monomers which are unsubstituted or substituted by a $C_{1-4}$ alkyl radical;

(b) from 10 to 70, preferably from 20 to 60, most preferably from 45 to 25, weight % of one or more $C_{1-6}$ alkyl esters of $C_{3-6}$ ethylenically unsaturated carboxylic acids; and (c) from 0 to 5, preferably from 0 to 3, weight % of one or more $C_{3-6}$ ethylenically unsaturated carboxylic acids.

In the essentially transparent copolymer preferably, the $C_{1-6}$ alkyl ester of a $C_{3-6}$ ethylenically unsaturated carboxylic acid is selected from the group consisting of methyl methacrylate, ethyl methacrylate, methyl acrylate, ethyl acrylate, butyl acrylate and butyl methacrylate; and the $C_{8-12}$ vinyl aromatic monomer is selected from the group consisting of styrene, α-methyl styrene, p-methyl styrene, and t-butyl styrene. The $C_{3-6}$ ethylencially unsaturated carboxylic acid may be selected from copolymerizable monomers containing a carboxylic acid functional group. Typically these acids include acrylic acid, methacrylic acid, fumaric acid and itaconic acid. Generally these functional monomers are introduced to impart polarity to the polymer. In some instances this improves the surface wettability of the polymer. While carboxylic acids are the functional group of choice other functional groups may be incorporated into the polymer. For example, the functional group could be incorporated by polymerizing an amide of the above acids, which amide may be unsubstituted or substituted at the nitrogen atom by up to two $C_{1-4}$ alkyl radicals. The functional group could be incorporated by incorporating into the polymer aldehydes corresponding to the above carboxylic acids. However, generally the acid monomers are most readily available and less costly.

The production of the essentially transparent polymer suitable for use in the present polymer alloys is within the purview of a person skilled in the art. Such polymers may be produced by suspension, solution, emulsion or bulk polymerization.

As noted above the term "blend" when used in association with the polymers of vinyl aromatic monomers and conjugated diolefins is not intended to mean an alloy nor to imply any order of mixing to the components of the present invnetion.

The blend of polymers comprising vinyl aromatic monomers and conjugated diene monomers comprises from 70 to 90, preferably from 70 to 85, most preferably from 75 to 80, weight % of a relatively higher vinyl aromatic monomer such as styrene containing polymer and from 30 to 10, preferably from 30 to 15, most preferably from 25 to 20 weight % of a relatively higher conjugated diolefin containing monomer.

The relatively higher vinyl aromatic monomer containing polymer is a linear or radial di- or tri-block polymer. The production of such copolymers is known to those skilled in the art. Such polymers can be produced by living solution polymerization (e.g. using a lithium catalyst). Examples of suitable relatively higher vinyl aromatic monomer containing polymers for use in the present invention are available from Phillips 66 Company and Firestone Synthetic Rubber and Latex Company.

Relatively higher vinyl aromatic monomer containing polymers useful in the present invention comprises:

(a) from 60 to 90, preferably from 70 to 80, weight % of one or more $C_{8-12}$ vinyl aromatic monomers which are unsubstituted or substituted by a $C_{1-4}$ alkyl radical; and (b) from 40 to 10, preferably from 30 to 20, weight % of one or more $C_{4-6}$ conjugated diolefin monomer.

The relatively higher conjugated diolefin monomer containing polymer is a tapered linear or radial di- or tri-block polymer. The production of such copolymers is also known to those skilled in the art. The process by which such a tapered copolymer is obtained is similar to the process by which block copolymers are obtained except that there is an incremental adjustment in the monomer feed (e.g. richer or poorer in vinyl aromatic/conjugate diolefin) to produce a block polymer which is "tapered". Examples of suitable relatively higher conjugated diolefin monomer containing polymers for use in the present polymer alloys are commercially available from Dexco Polymers and Firestone Synthetic Rubber and Latex Company.

Relatively higher conjugated diolefin monomer containing polymers useful in the present invention comprises:

(a) from 30 to 70, preferably from 40 to 45, weight % of one or more $C_{8-12}$ vinyl aromatic monomers which are unsubstituted or substituted by a $C_{1-4}$ alkyl radical; and (b) from 70 to 30, preferably from 60 to 55 weight % of one or more $C_{4-6}$ conjugated diolefins.

In the relatively higher vinyl aromatic monomer containing linear or radial di- or tri-block polymer and in the relatively higher conjugated diolefin monomer containing tapered- or linear- or radial-block copolymer said one or more $C_{8-12}$ vinyl aromatic monomers which are unsubstituted or substituted by a $C_{1-4}$ alkyl radical are selected from the group consisting of styrene, α-methyl styrene, p-methyl styrene, and t-butyl styrene and the one or more $C_{4-6}$ conjugated diolefin monomers are selected from the group consisting of butadiene and isoprene.

In the alloys of the present invention the essentially clear polymer forms a continuous matrix through which are distributed the relatively higher containing vinyl aromatic monomer polymer and the relatively higher containing conjugated diolefin monomer polymer. Without wishing to be bound by theory it is believed that the relatively higher vinyl aromatic monomer acts as a compatibilizer or as a surface active agent to help make the relatively higher conjugated diolefin monomer more compatible and possibly miscible in the essentially clear polymer.

The relatively higher vinyl aromatic monomer containing polymer and the relatively higher conjugated diene containing polymer are at least compatible. That is, these components of the alloy will have good interfacial adhesion. Under stress they will not delaminate. Preferably, the relatively higher vinyl aromatic monomer containing polymer and the relatively higher conjugated diene containing polymer are miscible. That is, when blended they will form a clear component, whether or not their refractive indices are matched or close.

In a preferred aspect of the present invention, the refractive index of the essentially clear polymer is matched to the refractive index of the blend of the relatively higher vinyl aromatic polymer and relatively higher conjugated diolefin polymer. If the refractive indices of the essentially polymer and a blend of the relatively higher vinyl aromatic monomer containing clear polymer and the relatively higher conjugated diene containing polymer match to within ±0.01, the alloy will have a low haze, preferably less than 10. If the refractive indices of the essentially clear polymer and a blend of the relatively higher vinyl aromatic monomer containing polymer and the relatively higher conjugated diene containing polymer match to within ±0.005, then the alloys will have extremely low haze.

In view of the above, the refractive index of the essentially clear polymer may be selected to try to minimize haze. By blending the relatively higher vinyl aromatic monomer containing polymer and the relatively higher conjugated diene containing polymer in the desired, or required, ratio, the refractive index of the resulting material may be measured if the relatively higher vinyl aromatic monomer containing polymer and the relatively higher conjugated diene containing polymers are miscible. Then, the composition of the brittle polymer may be estimated using the formula set forth in the Polymer Handbook, 2nd Ed. John Wiley and Sons Inc. and the refractive indices of the monomers. In this manner, it may be possible to match indices of refraction and obtain extremely clear and tough alloys.

The above is not intended to place any limitation on the order of mixing the polymers. It is not necessary to have a specific sequenced addition of polymers to the extruder.

In preparing the present polymer alloys, solution blending of the constituents is generally not useful as it is difficult to find a common solvent for each polymer in the blend. Typically, adequate mixing of the components can be achieved by mechanical mixing in a suitable intensive mixer, preferably an extruder. Operation of an extruder to achieve this end is within the purview of a person skilled in the art. For example, for an inch and a half extruder having an L to D ratio of about 24:1, the extruder is operated at from 30 to 150, preferably from 50 to 135, most preferably from 75 to 100, RPM. During operation, the barrel temperature of the extruder is in the range of from 190° C. to 240° C., preferably from 200° C. to 220° C.

In one aspect of the present invention, the relatively higher vinyl aromatic monomer containing polymer and the relatively higher conjugated diene containing polymer may be extruded and chopped into pellets. The resulting pellets may then be extruded with the essentially clear polymer. However, the components of the alloys of the present invention may also be dry blended in, for example, a tumble blender. The resulting blend may then be extruded. In an alternative procedure, the polymers may be fed directly to an extruder which provides good mixing.

Embodiments of the invention will be illustrated with reference to the following Examples which should not be construed so as to limit the scope of the present invention.

EXAMPLE 1

A number of polymer alloy samples were prepared using the following components:

| COMPONENT | |
|---|---|
| Essentially Clear Polymer | A copolymer derived from styrene (70 weight %) and methyl methacrylate (30 weight %), available from Novacor Chemicals Inc. |
| High Styrene Polymer | A linear tri-block copolymer derived from styrene (75 weight %) and butadiene (25 weight %). |
| High Diene Polymer | A tapered block copolymer derived from styrene (43 weight %) and butadiene (57 weight %). |

The components were obtained in the form of pellets and were fed, in the desired amounts, to an extruder. The ratio of high styrene polymer to high conjugated diolefin polymer was kept constant to match the refractive index of the essentailly clear polymer. The weight ratio of the essentially clear polymer was varied. Predrying of the resin components was not required. The extruder was operated at 75-100 rpm and a temperature in the range 190° C. to 200° C. The mixture was extruded, chopped into pellets and subsequently injection molded into a number of suitable test specimens 1/8 of an inch thick for conducting the following physical tests:

| Test | Identification |
|---|---|
| Haze | ASTM D-1003 |
| Unnotched Izod | ASTM D-256 |

The compositions and the results of the testing are set forth in Table 1.

TABLE 1

| Essentially Clear Polymer weight % | High Styrene/High Diolefin Polymer weight % | Haze % | Unnotched Izod ft.lb./in |
|---|---|---|---|
| 100 | — | 0.2 | 2.8 |
| 97.5 | 2.5 | 0.4 | 5.6 |
| 95 | 5 | 0.6 | 6.2 |
| 90 | 10 | 1.3 | 6.6 |

The data set forth in Table 1 shows that it is possible to obtain a clear tough alloy by incorporating very low amounts of a blend of a high vinyl aromatic monomer containing polymer and a high conjugated diolefin containing polymer.

EXAMPLE 2

The alloy of 95 weight % of essentially clear polymer and 5 weight % of the high styrene and high conjugated diolefin polymers was subjected to an environmental stress crack test. The sample was washed for 200 cycles in an automatic dish washer with CASCADE ® (trademark) detergent and JET-DRY ® (trademark) antispotting agent without showing any signs of crazing. The essentially clear polymer when subjected to the same test exhibited slight crazing after 75 cycles.

What is claimed is:

1. A polymer alloy comprising:
   (i) from 97.5 to 90 weight % of an essentially transparent copolymer comprising:
      (a) from 80 to 40 weight % of one or more $C_{8-12}$ vinyl aromatic monomers which are unsubstituted or substituted by a $C_{1-4}$ alkyl radical;
      (b) from 20 to 60 weight % of one or more monomers selected from the group consisting of: $C_{1-4}$ alkyl acrylates and $C_{1-4}$ alkyl methacrylates; and
      (c) from 0 to 3 weight % of one or more $C_{3-6}$ ethylenically unsaturated carboxylic acids; and
   (ii) from 2.5 to 10 weight % of a blend of polymers comprising:
      (a) from 70 to 90 weight % of a relatively higher vinyl aromatic monomer containing block copolymer comprising:
         (A) from 70 to 80 weight % of one or more $C_{8-12}$ vinyl aromatic monomers which are unsubstituted or substituted by a $C_{1-4}$ alkyl radical; and
         (B) from 30 to 20 weight % of one or more $C_{4-6}$ conjugated diolefin monomers; and
      (b) from 30 to 10 weight % of a relatively higher conjugated diolefin containing block copolymer comprising:
         (A) from 40 to 45 weight % of one or more $C_{8-12}$ vinyl aromatic monomers which are unsubstituted or substituted by a $C_{1-4}$ alkyl radical; and
         (B) from 60 to 55 weight % of one or more $C_{4-6}$ conjugated diolefin monomers.

2. The polymer alloy according to claim 1, wherein said essentially transparent polymer comprises:
   (a) from 55 to 75 weight % of said one or more $C_{8-12}$ vinyl aromatic monomers;
   (b) from 45 to 25 weight % of said one or more $C_{1-4}$ alkyl acrylates or $C_{1-4}$ alkyl methacrylates; and
   (c) from 0 to 3 weight % of said one or more $C_{3-6}$ ethylenically unsaturated carboxylic acids.

3. The polymer alloy according to claim 2, wherein in said $C_{1-4}$ alkyl acrylates and $C_{1-4}$ alkyl methacrylates are selected from the group consisting of methyl methacrylate, ethyl methacrylate, methyl acrylate, ethyl acrylate, and butyl acrylate and butyl methacrylate, said $C_{8-12}$ vinyl aromatic monomer is selected from the group consisting of styrene, α-methyl styrene, p-methyl styrene, and t-butyl styrene and said $C_{3-6}$ ethylenically unsaturated carboxylic acid is selected for the group consisting of acrylic acid, methacrylic acid, fumaric acid and itaconic acid.

4. The polymer alloy according to claim 1, wherein in said blend of said relatively higher vinyl aromatic monomer containing block copolymer and said relatively higher conjugated diolefin monomer containing block copolymer said one or more $C_{8-12}$ vinyl aromatic monomers which are unsubstituted or substituted by a $C_{1-4}$ alkyl radical are selected from the group consisting of styrene, α-methyl styrene, p-methyl styrene, and t-butyl styrene and said one or more $C_{4-6}$ conjugated diolefin monomers are selected from the group consisting of butadiene and isoprene.

5. The polymer alloy according to claim 4, wherein in blend of said relatively higher vinyl aromatic monomer containing block copolymer and said relatively higher conjugated diolefin monomer containing block copolymer said relatively higher styrene containing block copolymer is present in an amount from 70 to 85 weight % and said relatively higher conjugated diolefin containing block copolymer is present in an amount from 30 to 15 weight %.

6. The polymer alloy according to claim 4, wherein in said blend of said relatively higher vinyl aromatic monomer containing block copolymer and said relatively higher conjugated diolefin monomer containing block copolymer said relatively higher styrene containing block copolymer is present in an amount from 75 to 80 weight % and said relatively higher conjugated diolefin containing block copolymer is present in an amount from 25 to 20 weight %.

* * * * *